United States Patent
Kumar et al.

(10) Patent No.: US 11,188,790 B1
(45) Date of Patent: Nov. 30, 2021

(54) GENERATION OF SYNTHETIC DATASETS FOR MACHINE LEARNING MODELS

(71) Applicant: Streamoid Technologies, Inc., New York, NY (US)

(72) Inventors: Rajesh Kumar, Bangalore (IN); Sridhar Manthani, Bangalore (IN)

(*) Notice: Subject to any disclaimer, the term of this patent is extended or adjusted under 35 U.S.C. 154(b) by 0 days.

(21) Appl. No.: 16/294,078

(22) Filed: Mar. 6, 2019

Related U.S. Application Data

(60) Provisional application No. 62/639,359, filed on Mar. 6, 2018.

(51) Int. Cl.
*G06K 9/62* (2006.01)

(52) U.S. Cl.
CPC ......... *G06K 9/6257* (2013.01); *G06K 9/6262* (2013.01)

(58) Field of Classification Search
CPC ... G06K 9/6256; G06K 9/6257; G06K 9/6262
See application file for complete search history.

(56) References Cited

U.S. PATENT DOCUMENTS

| | | | |
|---|---|---|---|
| 10,339,470 B1* | 7/2019 | Dutta | G06N 20/20 |
| 2008/0025631 A1* | 1/2008 | Neal | G06T 7/0002 382/260 |
| 2016/0180447 A1* | 6/2016 | Kamalie | G06Q 30/0643 705/27.2 |
| 2016/0379132 A1* | 12/2016 | Jin | H04L 67/22 706/12 |
| 2019/0156151 A1* | 5/2019 | Wrenninge | G06K 9/6256 |
| 2019/0221001 A1* | 7/2019 | Dassa | H04N 21/4316 |

\* cited by examiner

*Primary Examiner* — Myron Wyche

(57) ABSTRACT

Methods are provided for training and validating deep learning models for visual search and related tasks as they pertain to fashion items such as garments. The methods presented address the special needs of visual search as it pertains to fashion and related industries by generating large numbers of synthetic images or videos for training deep learning models, and also for validating those models. Given a 3D model of a target garment, the methods select appropriate 3D models for humans and scenes, and also selects various values for the customizable parameters of each of the 3D models, and then renders an image or video. A dataset comprising such synthetic images can be blended with real-world tagged images to create composite datasets for training.

8 Claims, 5 Drawing Sheets

GENERATION OF SYNTHETIC DATASETS FOR MACHINE LEARNING MODELS

CROSS-REFERENCE TO RELATED APPLICATIONS

This application claims the benefit of U.S. Provisional Patent Application No. 62/639,359 filed on Mar. 6, 2018 and entitled "Use of Virtual Reality to Enhance the Accuracy in Training Machine Learning Models" which is incorporated by reference herein.

BACKGROUND

Field of the Invention

The present invention is in the field of machine learning and more particularly to the generation of datasets for training of machine learning systems.

Related Art

Deep learning, also referred to herein as machine learning, has entered all walks of life. There is interest in the developer community to employ deep learning techniques to solve problems primarily because of the ease-of-use of these algorithms and their remarkable results. However, deep learning is data intensive, as each use case has to have sufficient data in the training dataset to ensure a high level of accuracy. Given the need for a sufficient dataset, companies have had to invest heavily in procuring quality training data. When it comes to computer vision applications, sourcing images from the Internet for all use cases is not a trivial task. Some of the issues with human sourcing/tagging include that it is time consuming, including the training time to training human taggers, a high error rate in specialized fields, a general lack of source images.

Fashion data, for example, is extremely complex. There is no single source of truth for fashion. Using freely available images from the Internet as training data often gives poor results because the training data itself does not have consistent labels. For instance, a garment's length can be labeled as "mini" or "mid-thigh" or "above knee" etc. The same garment can be labeled as a "t-shirt" or "top." Moreover, there are more than 1000 different classes in fashion covering close to 50 potential attributes of a garment. Apart from image captioning, there is also a huge demand for visual search in the retail/e-tail industry. In such applications, one needs to find the exact mask of the garment in order to get high accuracy in a visual search.

Methods of using synthetic data to train and test on has been tried and tested for different applications involving human pose estimation, see for example, https://github.com/gulvarol/surreal. However, prior efforts have gone into placing human forms into different environments, for example, for training on recognition of humans in images which trains on larger forms and generalities. By contrast, for fashion purposes, the existence of a very small logo, or the placement of a zipper, or the number of buttons can change how a garment is classified. Changes in lighting can also affect how the colors of garments are perceived. Thus, prior methods of using synthetic data to train and test for fashion purposes have been inadequate to create training datasets sufficient for deep learning applications in fashion.

SUMMARY

Methods of the present invention are directed to creating datasets for training and validating machine learning systems. An exemplary method comprises repeatedly iterating steps to produce synthetic images, saving those images in a synthetic dataset, and combining the synthetic dataset with a dataset of tagged real-world images to form a composite dataset. The repeated steps include selecting a 3D human model from a plurality of 3D human models and selecting a 3D scene model from a plurality of 3D scene models, selecting values for parameters of the 3D human model, values for parameters of the 3D scene model, and values for parameters of a 3D target model, and rendering a synthetic image of the 3D target model on the 3D human model within the 3D scene model using the selected values. When the synthetic images are saved to the synthetic dataset, the images are saved in association with the values for the parameters used in their syntheses. The target, in various embodiments, can be a fashion item such as a garment, shoes, a hat, a hand bag, accessories, umbrellas, and the like.

Various embodiments of this exemplary method further comprise a step of training a machine learning system using the composite dataset, and/or validating a machine learning system using the composite dataset. In embodiments that further comprise a validation step, that step can include flagging a synthetic or real-world image of the composite dataset based on a failure of the machine learning system with respect to that image. A failure of the machine learning system can comprise a failure to tag the image correctly, or a failure to find the flagged image from among many images when asked to find an image including a target, where the target is within the flagged image. In some of these embodiments, the method further comprises rendering further synthetic images that simulate the flagged image. A further synthetic image can be rendered by first selecting new values for parameters of the 3D human model, new values for parameters of the 3D scene model, and new values for parameters of a 3D target model that are similar to, but at least some are different from, the values for the parameters or tags associated with the flagged image. Here, some new values may be the same as those associated with the flagged image, so long as some are not the same, such that the flagged image is not exactly replicated. Once the selection is completed, a new synthetic image of the 3D target model on the 3D human model within the 3D scene model using the newly selected values is rendered and saved to the composite dataset.

In various embodiments of the exemplary method, selecting values for parameters of the 3D human model, values for parameters of the 3D scene model, and values for parameters of the 3D target model includes selecting combinations of values of parameters such that the rendered synthetic images simulate a real-world tagged image. In other embodiments, a ratio of synthetic images to tagged real-world images is at least 9 to 1. Still other embodiments further comprise selecting or designing the 3D target model before selecting values for parameters of the 3D target model.

Another exemplary method of the present invention is directed to further training a machine learning system that has had at least some previous training but that failed on a real-world tagged image. As above, this exemplary method comprises repeatedly iterating steps to produce synthetic images, and saving those synthetic images in a synthetic dataset. The iterated steps include selecting a 3D human model from a plurality of 3D human models and selecting a 3D scene model from a plurality of 3D scene models, selecting values for parameters of the 3D human model, values for parameters of the 3D scene model, and values for parameters of a 3D target model such as for a garment, where the values of parameters for the 3D human model, the 3D target model, and the 3D scene model are selected such that a synthetic image rendered therefrom simulates the real-world tagged image. This exemplary method also includes a step of saving the synthetic images in association with the values for the parameters in the synthetic dataset, then training a machine learning system using the synthetic dataset.

Various embodiments of this exemplary embodiment further comprise selecting or designing the 3D target model before selecting values for parameters of the 3D target model. Various embodiments of this exemplary embodiment further comprise validating the machine learning system after training the machine learning system. In some of these embodiments, validating the machine learning system includes flagging a synthetic image of the synthetic dataset based on a failure of the machine learning system with respect to that image.

DETAILED DESCRIPTION

The present invention is directed to systems and methods that leverage 3D gaming design work to create datasets of images, videos, or both that are suitable to train machine learning systems. These methods merge two technologies AI (artificial intelligence) and VR (virtual reality) to expedite the data gathering/data curating work required for producing datasets for training deep learning models. Exemplary methods generate a synthetic dataset and then optionally train a machine learning system for specific scenarios using that dataset. Further, the methods can also help in testing and validating previously trained machine learning models, in peculiar to address real-world scenarios where the models yield poor results.

As applied to the fashion industry, exemplary methods generate multiple human models with different body shapes and poses, multiple 3D garments having various attributes like color, texture, and accessories, and multiple scenes and then generate a dataset by posing the human models in varied poses wearing the various garments within the multiple scenes. In this way the exemplary methods generate high-quality synthetic datasets as required for deep learning applications such as training and validation. In further methods, the synthetic dataset is combined with a dataset of real images, sourced from the Internet for example, that have been tagged by human taggers. The combined dataset can then be used for training of machine learning systems.

Fully and partially synthetic datasets can also be used for validating previously trained machine learning systems that have, perhaps, been trained using datasets of just human-tagged images, for instance. Here, synthetic datasets can be generated with images or videos that depict a diverse assortment of situations, and then the trained machine learning system is validated by testing the trained machine learning system using images or videos from the dataset. If the trained machine learning system is given a synthetic image and the trained machine learning system produces an incorrect result, the synthetic image and associated information can be employed to generate additional similar images for further training of that machine learning system. Likewise, if there are real-world situations where a trained machine learning system is known to operate poorly, synthetic images or videos can be generated to simulate those situations and then the machine learning system can be further trained on this narrowly tailored synthetic dataset.

Figure 1:
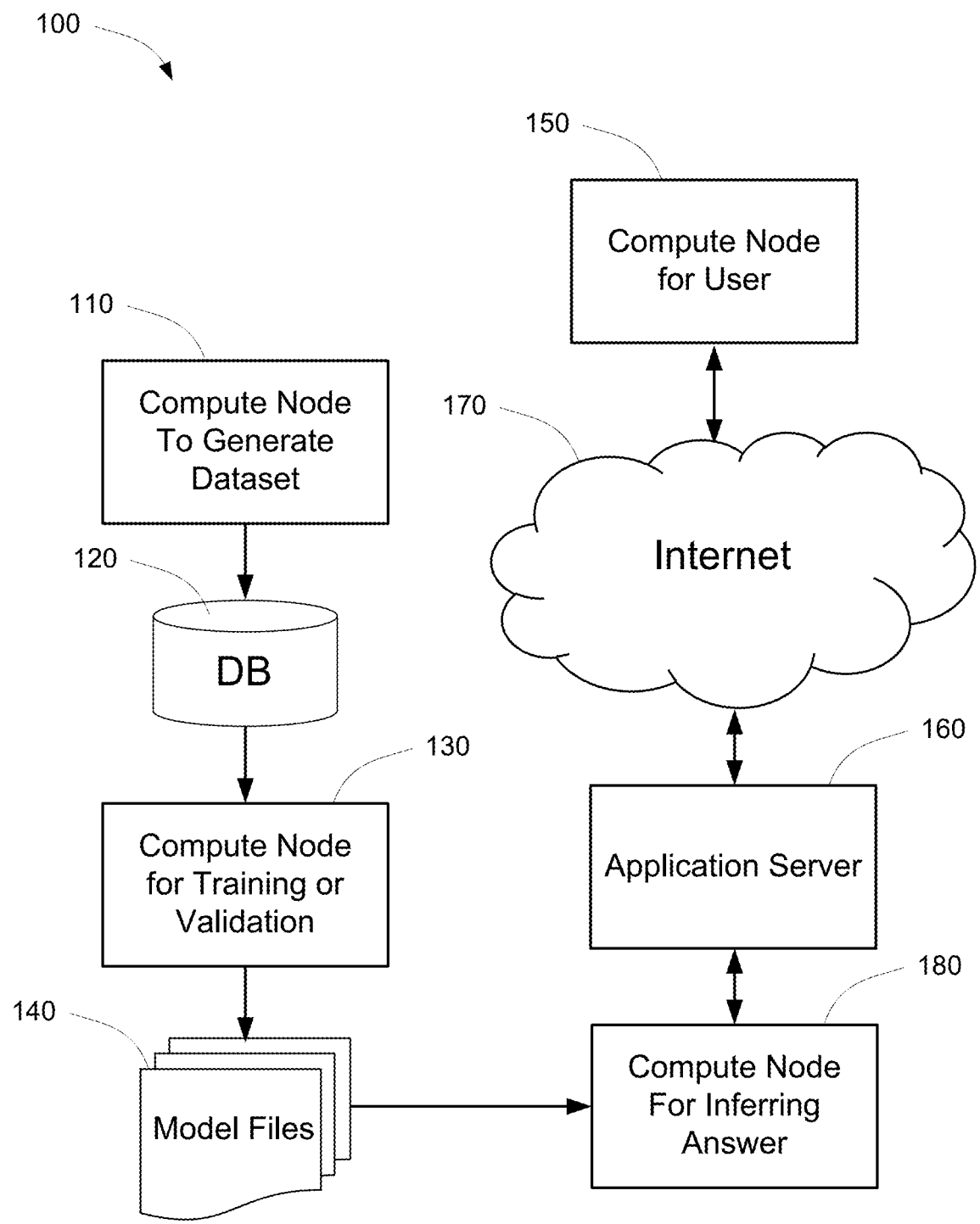
FIG. 1 is a schematic representation of a hardware environment, according to various embodiments of the present invention.

FIG. 1 is a schematic representation of an exemplary hardware environment 100. The hardware environment 100 includes a first compute node 110 that is employed to generate synthetic images and/or synthetic video to build a dataset. In various embodiments the compute node 110 is a server but can be any computing device with sufficient computing capacity such as a server, personal computer, or smart phone. The compute node 110 can optionally add non-synthetic, i.e., real-world images and/or video to the dataset. The compute node 110 stores the dataset to a database 120. A second compute node 130, which can be the same compute node as first compute node 110, in some embodiments, accesses the database 120 in order to utilize the dataset to train deep learning models to produced trained model files 140. The second compute node 130 can optionally also validate deep learning models.

A user employing a third compute node 150 can upload an image or video, including a target therein, to an application server 160 across a network like the Internet 170, where the application server 160 hosts a search engine, for example a visual search engine or recommendation engine, or an application like an automatic image tagging application. In response to a request from the compute node 150, such as a mobile phone or PC, to find information on the target, such as a garment, a hat, a hand bag, shoes, jewelry, etc., or to locate similar products, or to tag the image, the application server 160 connects the third compute node 150 to a fourth compute node 180, which can be the same compute node as either the first or second compute nodes 110, 130, in some embodiments. Compute node 180 uses the model files 140 to infer answers to the queries posed by the compute node 150 and transmits the answers back through the application server 160 to the compute node 150.

Figure 2:
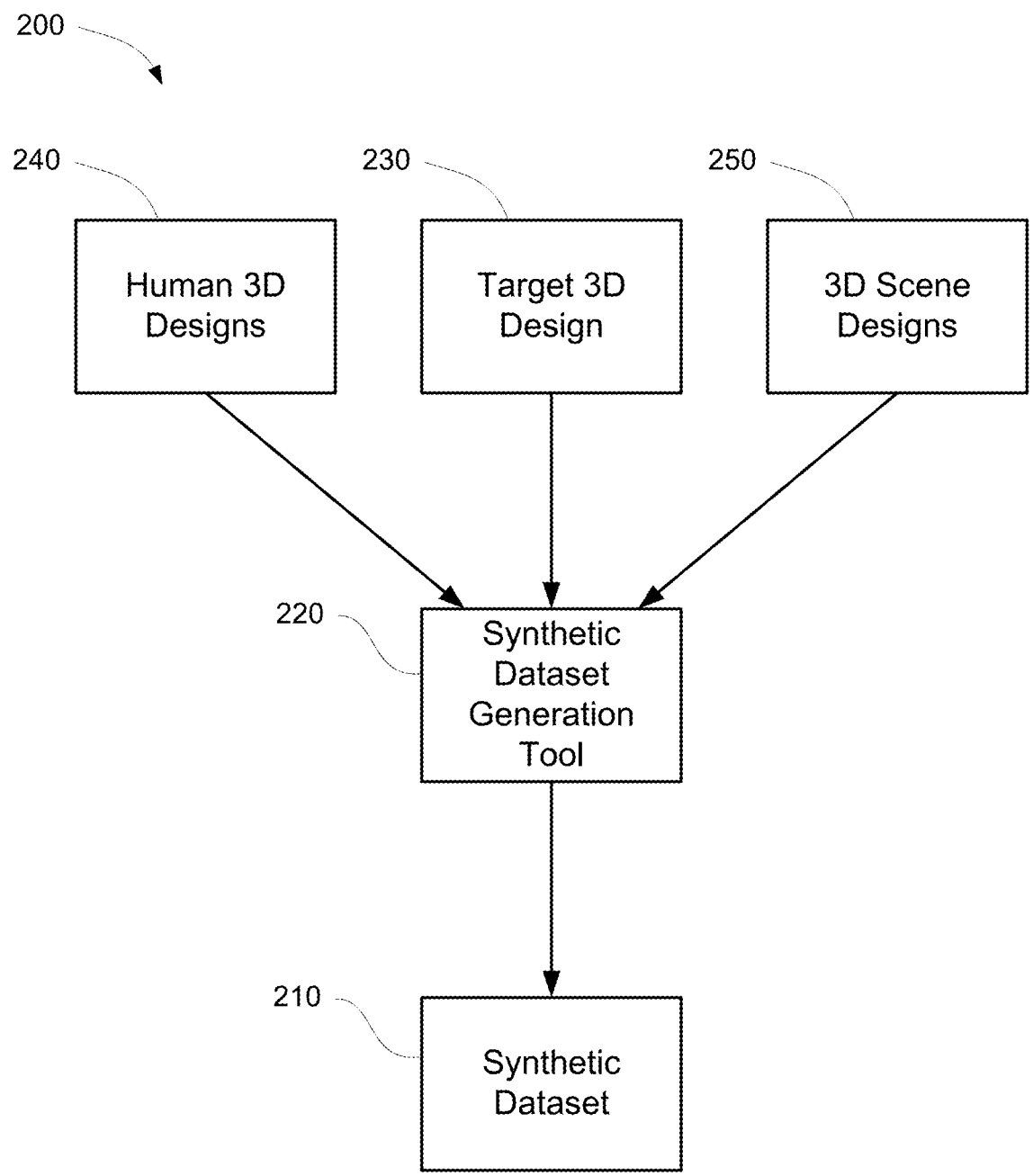
FIG. 2 is a schematic representation of a method for generating a dataset, according to various embodiments of the present invention.

FIG. 2 schematically illustrates a method 200 for generating a synthetic dataset 210. The synthetic dataset 210 is generated by a synthetic dataset generation tool 220 that receives, as input, one or more 3D designs 230 for targets, a plurality of 3D designs 240 for humans, and a number of 3D designs 250 for scenes. The generation tool 220 runs on compute node 110, in some embodiments. The terms "3D design" and "3D model" are used synonymously herein. The various 3D designs 230, 240, 250 can be obtained from the public sources over the Internet or from private data collections and stored in libraries such as in database 120 or another storage.

The generation tool 220 takes a 3D design 230 for a target, such as a garment, and combines it with a human 3D design from the plurality of 3D designs 240, and sets the combination in a 3D scene from the number of 3D designs 250. The generation tool 220 optionally also varies parameters that are made available by the several 3D designs 230, 240, 250 to populate the synthetic dataset 210 with a very large number of well characterized examples for training a deep learning model or for validating an already trained deep learning model. In some embodiments, specific combinations of 3D designs 230, 240, 250 are selected to represent situations in which an already trained deep learning model is known to perform poorly.

Figure 3:
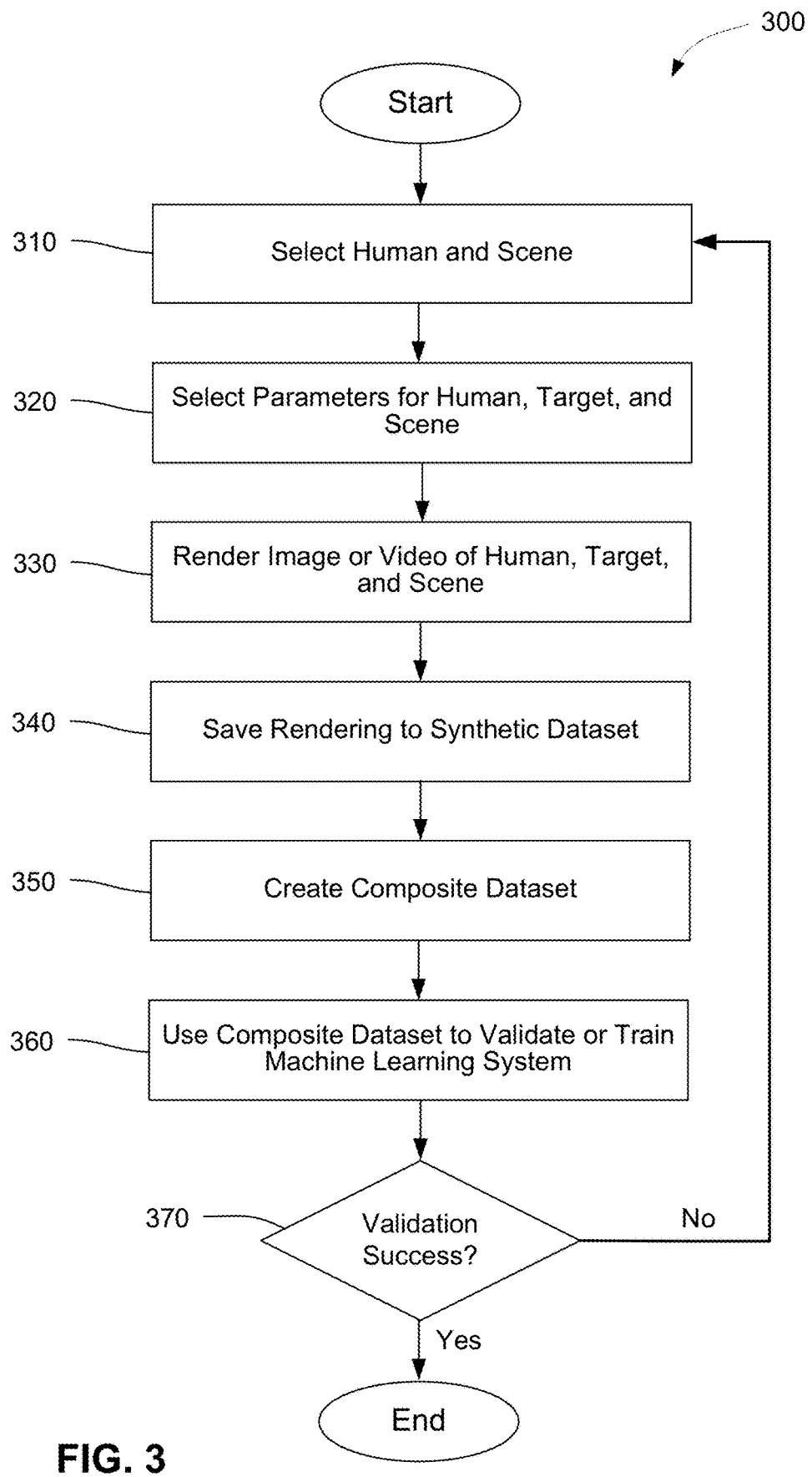
FIG. 3 is a flowchart representation of a method according to various embodiments of the present invention.
Figure 4A:
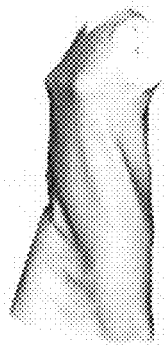
FIGS. 4A-4D illustrate, respectively, a 3D design for target garment, a 3D design for a human in a pose, a fabric design for the target garment, and a rendered image of the human model wearing the garment model within the scene model, all according to various embodiments of the present invention.
Figure 4B:
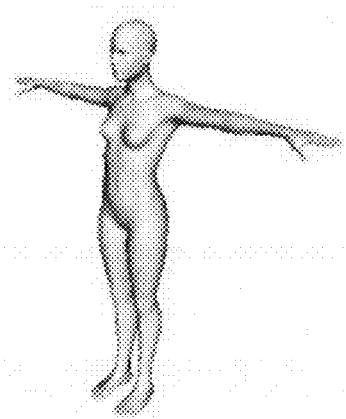
Figure 4C:
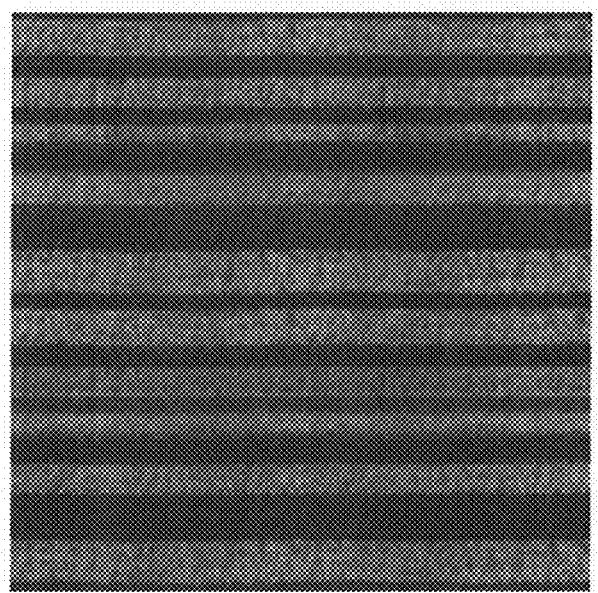
Figure 4D:
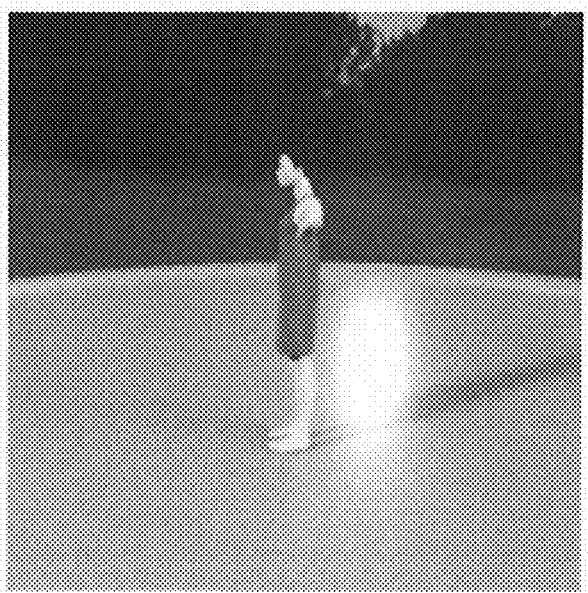

FIG. 3 is a flowchart representation of a method 300 of the present invention for producing a dataset of images and/or videos for training or validating deep learning models. The method 300 can be performed, for example, by first compute node 110 running generation tool 220, in some embodiments. The method 300 applies to a given target, such as a garment, on which the training dataset is centered. While the method 300 is described with respect to a single target, in practice multiple targets can be processed simultaneously to create synthetic datasets 210 for each target, or a synthetic dataset 210 for all targets.

In a step 310 a 3D design 230 for a target is received or produced, for example an object file for a garment, and a 3D design 240 for a human is selected from the 3D designs 240 for humans and a 3D design 250 for a scene is selected from the 3D designs 250 for scenes, also as object files. A 3D design 230 can be provided by a user of the method 300, for example by selecting the 3D design 230 from a library, or by designing the 3D design 230 with commercially available software for designing garments. An example of a utility for creating 3D designs 240 for humans is Blender. In other embodiments, the 3D design 230 is selected from a library based on one or more values of one or more parameters. For instance, to produce a synthetic dataset for further training a trained deep learning model to improve the model for garments that are made from certain fabrics, a 3D design 230 for a garment can be selected from a library based on the availability of one of those fabrics within the fabric choices associated with each 3D design 230.

In some embodiments, the selections of both the 3D design 240 for the human and the 3D design 250 for the scene are random selections from the full set of available choices. In some instances, meta data associated with the target limits the number of possibilities from the 3D designs 240 for humans and/or 3D designs 250 for scenes. For example, meta data specified by the object file for the target can indicate that the garment is for a woman and available in a limited range of sizes, and as such only 3D designs 240 of women in the correct body size range will be selected.

In other embodiments the 3D design 240 for a human and the 3D design 250 for a scene are purposefully selected, such as to train an existing deep learning model that is known to perform poorly under certain circumstances. In these embodiments a synthetic dataset 210 of images and/or videos is produced that are tailored to the known weakness of the existing deep learning model. For example, a deep learning model is trained to recognize a jumpsuit, but if during validation an image including the jumpsuit is given to the model and the model fails to recognize the jumpsuit, that instance will be flagged as a mistake. Ideally, the model is further trained to better recognize the jumpsuit, but using only this flagged image for the further training will not meaningfully impact the model's accuracy. To properly further train the model, the flagged image is sent to the synthetic dataset generation tool 220 to generate many additional synthetic images or video that are all similar to the flagged image.

In some embodiments, the synthetic dataset generation tool 220 is configured to automatically replicate the flagged image as closely as possible given the various 3D models available. In these embodiments the synthetic dataset generation tool 220 is configured to automatically select a closest 3D model to the target jumpsuit, select a closest 3D scene to that in the flagged image, and select a closest human 3D model to that shown in the flagged image.

In a step 320 values for various variable parameters for the target and the selected 3D human designs 230, 240 and selected 3D scene design 250 are further selected. For the 3D design 240 of the human these parameters can include such features as pose, age, gender, BMI, skin tone, hair color and style, makeup, tattoos, and so forth, while parameters for the 3D design 230 can include texture, color, hemline length, sleeve length, neck type, logos, etc. Object files for the selected 3D models 230, 240, 250 can specify the available parameters and the range of options for each one; above, an example of a parameter is type of fabric, where the values of the parameter are the specific fabrics available. Parameters for the 3D scene 250 can include lighting angle and intensity, color of the light, and location of the target with the human within the scene. Thus, if 50 poses are available to the selected 3D design 240 for a human, in step 320 one such pose is chosen. As above, values for parameters can be selected at random, or specific combinations can be selected to address known weaknesses in an existing deep learning model. The synthetic dataset generation tool 220, in some embodiments, automatically selects values for parameters for the several 3D models, such as pose for the human 3D model. In some embodiments, a user of the synthetic dataset generation tool 220 can visually compare a synthetic image or video automatically produced to the flagged image or video and optionally make manual adjustments to the synthetic image or video. With this synthetic image or video as a starting point, small variations in the human 3D model and the 3D scene model and the values of the various parameters used by the 3D models can be made in successive iterations to produce still additional synthetic images or videos to populate a synthetic dataset for further training.

In a step 330 an image or video is rendered of the target with the human set in the scene. FIGS. 4A-4D illustrate, in order, a 3D design 230 for target garment, a 3D design 240 for a human in an exemplary pose, a fabric design as an exemplary parameter of the 3D design 230 for the target garment, and a rendered image of the human model wearing the garment model in the scene model. In these examples, polygon meshes are employed for the garment and human 3D designs but any of the 3D designs noted herein can also be represented polygon tables or plane equations as well.

In a step 340 the rendered image is saved as a record to a synthetic dataset. Examples of suitable rendering software includes those available through Blender and Houdini. Each such record includes the values of the parameters that were used to create it. Such information serves the same function in training as image tags in a tagged real-world image. By repeating the steps 310-340 many times, an extensive library can be developed of images or videos of the same target or targets in varied contexts. In some embodiments, all selections are under the manual control of a user through a user interface.

In an optional step 350 a composite dataset is created by merging the synthetic dataset with tagged real-world images or videos. The real-world images or videos can be sourced from the Internet, for example, and tagged by human taggers. Examples of real-world videos include fashion ramp walk videos and fashion video blogger videos. In some embodiments, a suitable composite dataset includes no more than about 90% synthesized images and at least about 10% real-world images with image tags.

In an optional step 360 the composite dataset is used to train or validate a machine learning system. Training of a deep learning model can be performed, for example, using a commercially available deep learning framework such those made available by TensorFlow, caffe, MXNet, and Torch, etc. The framework is given a configuration that specifies a deep learning architecture, or a grid search is done where the framework trains the deep learning model using all available architectures in the framework. This configuration has the storage location of the images along with their tags or synthesis parameters. The framework takes these images and starts the training. The training process is measured in terms of "epochs." The training continues until either convergence is achieved (validation accuracy is constant) or a stipulated number of epochs is reached. Once the training is done, the framework produces a model file 140 that can be used for making inferences like making predictions based on query images.

To validate a machine learning system in step 360, the machine learning system is given images from the dataset to see how well the machine learning system characterizes the images, where performance is evaluated against a benchmark. The result produced for each image provided to the machine learning system is compared to the values for the parameters, or image tags, in the record for that image to assess, on an image by image basis, whether the machine learning system was correct. A percentage of correct outcomes is one possible benchmark, where the machine learning system is considered validated if the percentage of correct outcomes equals or exceeds the benchmark percentage. If the machine learning system fails the validation, at decision 370, the images that the machine learning system got wrong can be used to further train the machine learning system and can be used as bases for further synthetic image generation for the same, looping back to step 310.

Figure 5:
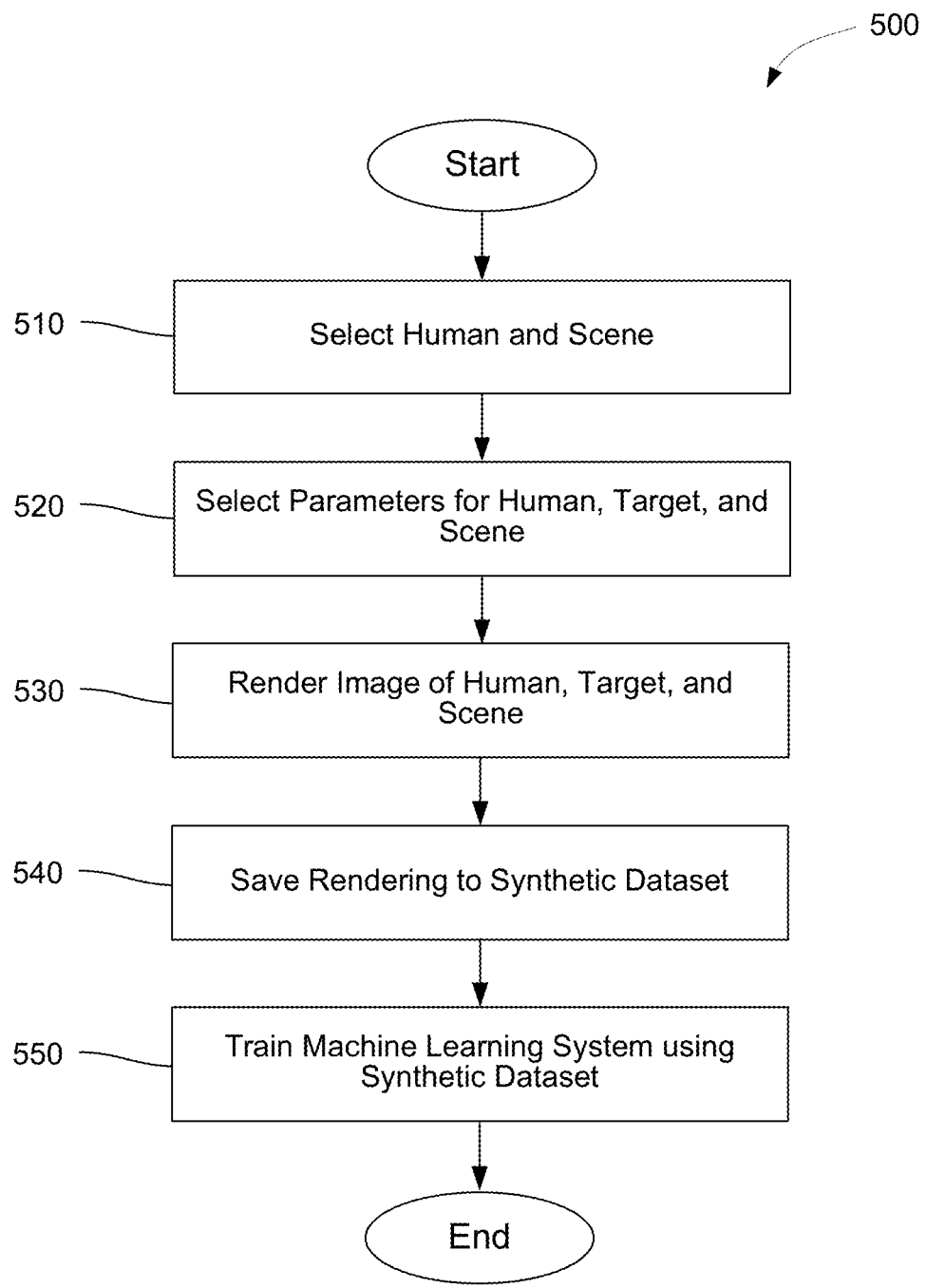
FIG. 5 is a flowchart representation of another method according to various embodiments of the present invention.

FIG. 5 is a flowchart representation of a method 500 of the present invention for producing a dataset of images and/or videos for training or validating deep learning models. Steps 510-540 correspond to steps 310-340 of method 300. Instead of adding non-synthetic images or videos, as in method 300, in method 500 only the synthetic images or videos are used. The synthetic dataset is used to train a machine learning system in a step 550. One can use method 500 where an existing machine learning system fails a validation. For example, if a machine learning system fails a validation using real-world tagged images or videos, the particular images that the machine learning system got wrong can be simulated by selecting values for parameters in step 520 that will closely approximate, or simulate, the images that the machine learning system got wrong. Such simulated synthetic images can differ in small ways, one from the next.

The descriptions herein are presented to enable persons skilled in the art to create and use the systems and methods described herein. Various modifications to the embodiments will be readily apparent to those skilled in the art, and the generic principles defined herein may be applied to other embodiments and applications without departing from the spirit and scope of the inventive subject matter. Moreover, in the following description, numerous details are set forth for the purpose of explanation. However, one of ordinary skill in the art will realize that the inventive subject matter might be practiced without the use of these specific details. In other instances, well known machine components, processes and data structures are shown in block diagram form in order not to obscure the disclosure with unnecessary detail. Identical reference numerals may be used to represent different views of the same item in different drawings. Flowcharts in drawings referenced below are used to represent processes. A hardware processor system may be configured to perform some of these processes. Modules within flow diagrams representing computer implemented processes represent the configuration of a processor system according to computer program code to perform the acts described with reference to these modules. Thus, the inventive subject matter is not intended to be limited to the embodiments shown, but is to be accorded the widest scope consistent with the principles and features disclosed herein.

The foregoing description and drawings of embodiments in accordance with the present invention are merely illustrative of the principles of the invention. Therefore, it will be understood that various modifications can be made to the embodiments by those skilled in the art without departing from the spirit and scope of the invention. The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

What is claimed is:

1. A method comprising:
repeatedly
selecting a 3D human model from a plurality of 3D human models and selecting a 3D scene model from a plurality of 3D scene models,
selecting values for parameters of the 3D human model, values for parameters of the 3D scene model, and values for parameters of a 3D garment model, and
rendering a synthetic image of the 3D garment model on the 3D human model within the 3D scene model using the selected values;
saving the synthetic images in association with the values for the parameters in a synthetic dataset;
combining the synthetic dataset with a dataset of tagged real-world images to form a composite dataset; and
validating the machine learning system after training the machine learning system, wherein validating the machine learning system includes flagging a synthetic image of the synthetic dataset based on a failure of the machine learning system with respect to that image, and wherein the failure to find the flagged image from among many images when asked to find an image including a target, where the target is within the flagged image.

2. The method of claim 1 further comprising training a machine learning system using the composite dataset.

3. The method of claim 1 further comprising:
selecting new values for parameters of the 3D human model, new values for parameters of the 3D scene model, and new values for parameters of a 3D garment model that are similar to, but at least some are different from, the values for the parameters or tags associated with the flagged synthetic or real-world image,
rendering a new synthetic image of the 3D garment model on the 3D human model within the 3D scene model using the newly selected values, and
saving the new synthetic image to the composite dataset.

4. The method of claim 1 wherein selecting values for parameters of the 3D human model, values for parameters of the 3D scene model, and values for parameters of the 3D garment model includes selecting combinations of values of parameters such that the rendered synthetic images simulate a real-world tagged image.

5. The method of claim 1 wherein a ratio of synthetic images to tagged real-world images is at least 9 to 1.

6. The method of claim 1 further comprising selecting or designing the 3D garment model before selecting values for parameters of the 3D garment model.

7. A method comprising:
 repeatedly
  selecting a 3D human model from a plurality of 3D human models and selecting a 3D scene model from a plurality of 3D scene models,
  selecting values for parameters of the 3D human model, values for parameters of the 3D scene model, and values for parameters of a 3D garment model for the garment, wherein the values of parameters for the 3D human model, the 3D garment model, and the 3D scene model are selected such that a synthetic image rendered therefrom simulates a real-world tagged image, and
  rendering the synthetic image of the 3D garment model on the 3D human model within the 3D scene model;
 saving the synthetic images in association with the values for the parameters in a synthetic dataset;
 training a machine learning system using the synthetic dataset; and
 validating the machine learning system after training the machine learning system, wherein validating the machine learning system includes flagging a synthetic image of the synthetic dataset based on a failure of the machine learning system with respect to that image, and wherein the failure to find the flagged image from among many images when asked to find an image including a target, where the target is within the flagged image.

8. The method of claim 7 further comprising selecting or designing the 3D garment model before selecting values for parameters of the 3D garment model.

\* \* \* \* \*

UNITED STATES PATENT AND TRADEMARK OFFICE
CERTIFICATE OF CORRECTION

PATENT NO. : 11,188,790 B1  
APPLICATION NO. : 16/294078  
DATED : November 30, 2021  
INVENTOR(S) : Narayana et al.

Page 1 of 1

It is certified that error appears in the above-identified patent and that said Letters Patent is hereby corrected as shown below:

On the Title Page

Replace Item (12) with Narayana et al.

Please replace the Inventors with the following updated listing with added inventors:
Rajesh Kumar Saligrama Anantha Narayana, Bangalore (IN)
Susa Hasan, LONDON (UK)

Signed and Sealed this
Eighteenth Day of October, 2022

Katherine Kelly Vidal
*Director of the United States Patent and Trademark Office*